Nov. 30, 1965   W. L. PETICOLAS   3,221,084
MANUFACTURE OF POLYETHYLENE FILM
Filed May 26, 1959   2 Sheets-Sheet 1
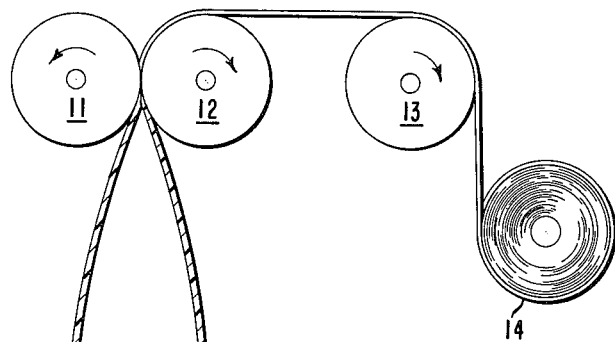
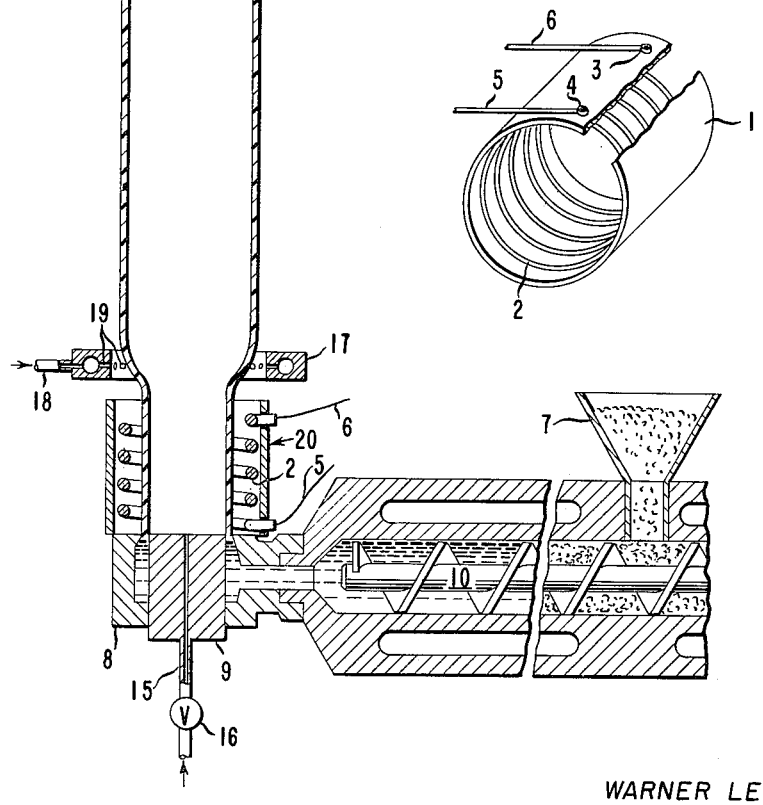
INVENTOR
WARNER LELAND PETICOLAS
BY
ATTORNEY Nov. 30, 1965    W. L. PETICOLAS    3,221,084
MANUFACTURE OF POLYETHYLENE FILM
Filed May 26, 1959    2 Sheets-Sheet 2

INVENTOR
WARNER LELAND PETICOLAS

BY   *a. Mc Alevy*

ATTORNEY

United States Patent Office 3,221,084
Patented Nov. 30, 1965

3,221,084
MANUFACTURE OF POLYETHYLENE FILM
Warner Leland Peticolas, Wilmington, Del., assignor to E. I. du Pont de Nemours and Company, Wilmington, Del., a corporation of Delaware
Filed May 26, 1959, Ser. No. 815,893
4 Claims. (Cl. 264—25)

This invention relates to an improvement in the production of blown polyethylene film. More particularly this invention relates to a process for the manufacture of polyethylene film having improved gloss.

Thin films of polyethylene are commonly made by blowing processes in thicknesses as little as 0.0005". Such films have found wide spread use for packaging goods for sale in stores and the like. Films having a high degree of gloss are particularly desired for such applications, since such films display the goods contained therein most attractively.

Blown film is produced by extruding polyethylene in a plastic formation state through an annular die to form a seamless tube. The tube is flattened between nip rolls and withdrawn from the die at a rate greater than that at which the polymer is extruded, thereby imparting a longitudinal draw to the product. At the commencement of the operation, the closed space within the extrudate between the die and the nip rolls is pressurized with a gas, usually air, thereby inflating the extrudate to a greater diameter than the diameter at the die and imparting a lateral draw. Cooling means located between the die and nip rolls, such as an air ring, disclosed by Fuller in U.S. Patent 2,461,975 issued February 15, 1949, or a cooled metal surface in close proximity to the surface of the film are employed in order to set the plasticated polyethylene to its final shape. The drawing processes greatly improve the strength of the resultant film.

The gloss of the manufactured film varies with many process variables, and in particular with the temperature at which the polyethylene is extruded. As the temperature of extrusion is increased the gloss of the finished product is improved, until a temperature of about 180° C. is reached. On further increasing the temperature the gloss deteriorates.

It has been discovered that if the exterior surface of the polyethylene extrudate is further heated by radiant heat from a source having a temperature of at least 200° C., on the exterior surface of the extrudate as it emerges from the die, significant improvements are obtained in the gloss of the finished product. The heat may be conveniently supplied from a hollow cylindrical heating chamber surrounding the polyethylene film as it emerges from the die.

The invention will be better understood by reference to the accompanying drawings.

FIGURE 1 is a perspective view of a suitable heating cylinder cut away to show the construction.

FIGURE 2 is a diagram partly in section, showing the application of the heating chamber to an extrusion and blowing process utilizing an air ring for setting the film to its final shape.

Figure 3:
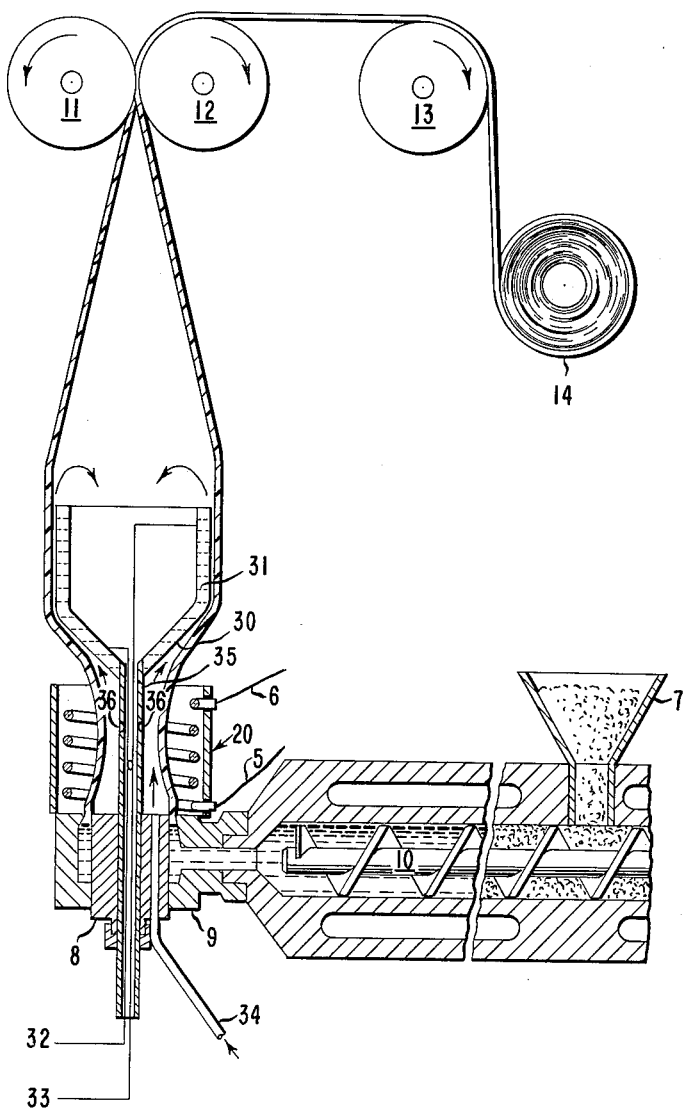
FIGURE 3 is a diagram partly in section, showing the application of the heating chamber to an extrusion and blowing process utilizing an internal cooled mandrel to set the film in its final form.

Referring now to FIGURE 1. The heating cylinder may be constructed from a short length of steel tubing 1 which acts as a support and reflector for the heating element 2. The heating element 2, consists of resistance heater; such as one of the well-known "Calrod" heaters manufactured by the General Electric Company, wound into an open helix of about five times and secured to the metal cylinder 1 by insulated bolts 3 and 4 which serve as terminals for the electrical connections 5 and 6. The heater 2 may be of any suitable wattage. A five kilowatt heater has been found excellent for use with an eight inch diameter coil. Heaters of greater or lesser wattage should be employed as the size of the heating cylinder is made greater or less respectively.

Referring now to FIGURE 2, the drawing shows the position of the heater for operation with a blown film process employing an air cooling ring.

Polyethylene molding cubes are fed into the hopper 7 of the extruder where they are plasticated and driven forward to the die 8, 9, by the extruder screw 10. The extruder screw is driven through a gear train by an electric motor (not shown). The plasticated polyethylene is forced through the annular gap found between the core of the die 9 and the body 8 into a tubular extrudate which is flattened and withdrawn by the nip roll 11, 12 and from thence over a spreader roll 13 which has shallow helical grooves in the surface of the roll, cut in opposing rotational sense from the center of the roll, whereby an outward component of force is imparted to the tube, thereby keeping if fully extended. The flattened tube is then recovered on the wind-up roll 14. Air is introduced into the tubular extrudate by tube 15 through the core of the die 9 in sufficient amount to inflate the extrudate to the desired diameter and the valve 16 is then closed forcing a closed bubble within the extrudate which bubble is confined between the nip rolls 11, 12 and the die 8, 9. The film is set in its final form by the air ring 17 which comprises a hollow annular chamber, with an air inlet 18 through which air is supplied and a plurality of orifices 19 disposed on the inner surface of the toroid whereby a stream of air is directed on the surface of the polyethylene film, cooling and setting it to its final shape.

The heating cylinder 20, which has been more fully shown in FIGURE 1 and the description of that figure is located between the air-cooling ring 17 and the die 8, 9, adjacent to, but not necessarily in contact with the die.

FIGURE 3 shows another blown film process in which the features, similar to those of FIGURE 2, have been given the same numbers. After extrusion of the plastic through the annular die 8, 9, the extrudate passes over the cooling mandrel 30 which is formed so that a drag flow of air is produced, spacing the plastic film from the mandrel by a small distance, usually 0.005" or less. The mandrel is cooled by a water jacket 31 supplied with water by pipes 32 and 33, and the film is cooled and set by the metal surface of the mandrel in close proximity to the internal surface of the tube. Air, in quantity greater than that to supply the drag flow, is provided by an air inlet 34 and the excess is vented by an outlet through the hollow supporting post 35 through the perforations 36. The air is supplied by tube 34 at a sufficient rate so that a dynamic pressure is induced which causes the expansion of the film. The air carried past the cooling mandrel is also vented to the atmosphere through the hollow supporting post 35, thus serving to equalize pressure above and below the cooler. With this apparatus the heating cylinder 20 is placed adjacent to the die as shown.

Due to the greater efficiency of heat transfer with the substantial absence of mechanical friction in the apparatus shown in FIGURE 3, polyethylene film may be fabricated at much greater speeds than heretofore.

With regard to the dimensions of the heating cylinder, the effect of the heat treatment is substantially independent of the diameter of the heating coils. It is essential that the heating elements should be spaced from the surface of the extrudate by a distance of about one to two inches in order to provide a sufficient space to accommodate small spasmodic movements of the bubble which occur during the extrusion. Greater clearance than this is not objectionable, but is wasteful of the space about the die which is usually restricted by supporting structures and the like.

The length of the heating chamber is suitably from 3 to 10", but is not critical. The maximum length will be determined by other process variables such as the predetermined height above or below the die at which expansion of the plastic extrudate occurs.

With regard to the temperature of the heating cylinder, little effect takes place if the heating cylinder is at a temperature below about 200° C. but at temperatures in excess of 200° C. the gloss improves rapidly with temperature, other factors being equal. The maximum temperature which may be employed is determined by the decomposition temperature of the polyethylene and by the rate of extrusion of the polymer. In general, greater rates of extrusion require a greater temperature to produce the same effect as the same temperature at lower rates of extrusion.

It will be obvious that the practice of this invention is not limited by the particular type of heating apparatus employed, which is described to illustrate the process of the invention and by no means is intended to limit the scope thereof. For example, a battery of infrared lamps symmetrically disposed about the axis of the die and directed on the plastic as it emerges from the die may be employed to provide the necessary radiant heat.

It will likewise be obvious that the process of the invention may be applied to extrusion in a downwards direction as well as in an upwards direction.

The invention is further illustrated by the following examples. In these examples, the gloss was measured within a Gardner portable glass meter using 20° incident light (ASTM-D-523-53T). The units in which the results are expressed are 1/1000 the light reflected by a perfect reflector.

*Example I*

Blown polyethylene film was fabricated by extruding low density polyethylene through a ring die followed by inflation with air according to the method illustrated in the accompanying drawing, FIGURE 2. The temperature of the extruder barrel was 160° C. and the die temperature was also 160° C. The diameter of the ring die was 4". Thirty feet/minute of film having a thickness of 0.001" and a circumference of 20" were produced. Without a heating chamber the film produced had a gloss of 23 units.

A heating band 6" in diameter and 3" in height was placed about the tubular extrudate as it emerged from the die. The gloss improved to a value of 36 units. The temperature of the heating band was then raised to 340° C. The measured gloss value of the film produced was 54, an improvement of 135%.

*Example II*

Using the same equipment as in Example I, film was produced under the following conditions: Stock temperature 150° C., die temperature 200° C., rate of take-off 24 ft./min., thickness of finished film 0.0013", circumference of film 16–20". With the heating band off, the measured value of the gloss was 35 units. With the heater band at 200° C., the same temperature as the die, the gloss improved to a value of 60 units; an improvement of 70%.

*Example III*

With the same equipment as in Example I, polyethylene film was extruded from a low density polyethylene molding powder under the following conditions: Stock temperature 160° C., die temperature 160° C., rate of extrusion 49 gm./minute, rate of take-off 16 ft./minute, thickness of finished film 0.0010 mils. and circumference of film 16–20".

With the heater band off, the gloss of the finished film was 24 units. With the heater at 200° C. the gloss measured was 45 units. With the heater at 250° C. the gloss was 55 units. On further raising the temperature to 280° C. the glass improved to 70 units.

*Example IV*

Using the same equipment as in Example I, and the same conditions as in Example III, film was produced from a "high gloss" polyethylene resin.

With the heater band "off" the measured gloss value was 65. With the heater band at 300° C. the gloss improved to a value greater than 100 units.

*Example V*

Blown polyethylene film was produced by extrusion of polyethylene through a 4" ring die. The film was expanded by air pressure and set by internal cooling. The temperature of the extruder stock was 146° C. The temperature of the die was 154° C. The extrusion rate was 41 lbs./hour. Take-off was 75 ft./minute of film having a gage of 0.0008 to 0.00013 inch and a circumference of 18".

An electrical heating band was constructed 8" in diameter and 4" in length from 5 coils of 5 kw. "Calrod" resistor, contained in a cylindrical steel framework. With the heater band "off" the gloss of the finished product was 56. With the heating band at 412° C. the gloss improved to 66.

*Example VI*

Blown polyethylene film was produced by the same equipment and conditions as in Example V, except that the die temperature was 160° C. and the stock temperature of the extruder was also 160° C.

With the heater band "off," the gloss of the finished film was found to be 56 units. With the heater band at 434° C. the gloss was found to be 80 units.

*Example VII*

Blown polyethylene film was produced by the equipment of Example V. The temperature of the extruder stock was 185° C. and the temperature of the die was 180° C. 96 lbs./hour of polyethlene were extruded and blown to 150 ft./minute of film having a circumference of 36" and a thickness of 0.0004 to 0.0008 inch.

With the heating chamber "off" the gloss of the finished film was 57 units. With the heater band at 365° C. the gloss was 63 units; at 385° C. the gloss was 67 units and at 406° C. the gloss was 68.

*Example VIII*

Blown polyethylene film was produced by the equipment of Example V. The temperature of the extruder stock was 185° C. and that of the die 171° C. 100 lbs./hour of polyethylene were extruded into 180 ft./minute of film 0.0004 to 0.0008" in thickness and 36" in circumference.

With the heating chamber "off" the gloss of the finished produce was 49 units. With the heating chamber maintained at 410° C. the gloss of the finished film was 67 units.

*Example IX*

With the apparatus described in Example V, film was extruded at 300 feet/minute the rate of extrusion being 200 lbs./hour.

With the heating chamber "off" the gloss was found to be 50 units, and with the heater band at 605° C. the gloss was 75 units.

I claim:

1. In the production of blown polyethylene film by dry extrusion of polyethylene through an annular die to form a seamless tubular extrudate and expanding the said extrudate by inflation with air while said tube is in a formative plastic state, the improvement which comprises supplying radiant heat to the exterior surface of said extrudate as it emerges from said die from a source having a temperature of at least 200° C. to raise said exterior surface to a temperature greater than the extrusion temperature but less than the degradation temperature of the extrudate.

2. In the production of blown polyethylene film by dry extrusion of polyethylene through an annular die to form a seamless tubular extrudate and expanding the said extrudate by inflation with air while said tube is in a formative plastic state, the improvement which comprises passing said extrudate through a hollow cylindrical heating chamber adjacent to said die, the walls of said chamber being spaced from said extrudate and maintained at a temperature between 200° C. and 600° C. to raise the exterior surface of said extrudate to a temperature greater than the extrusion temperature but less than the degradation temperature of the extrudate.

3. In a method of forming a continuous sheet from a thermoplastic material of the character described, wherein said material is softened under heat and pressure to a substantially uniform extrudable consistency, extruded to form a continuous sheet of said material and said sheet than passed through at least one cooling zone and stretched to produce molecular orientation in said sheet, the improvement which comprises defining a confined path of movement extending between the point of extrusion and said cooling zone, passing said sheet as formed by extrusion through said confined path of movement without contact, and maintaining said extruded sheet at not substantially less than its extrusion temperature and at substantially extrusion dimensions during passage through said confined path.

4. The method of claim 3 wherein the thermoplastic material is polyethylene.

References Cited by the Examiner

UNITED STATES PATENTS

| 2,047,554 | 7/1936 | Fischer | 18—14 |
| 2,364,435 | 12/1944 | Foster et al. | 18—57 |
| 2,433,937 | 1/1948 | Tornberg | 18—14 |
| 2,461,975 | 2/1949 | Fuller | 18—57 |
| 2,583,330 | 1/1952 | Eckert | 18—14 |
| 2,688,773 | 9/1954 | McIntire | 18—57 |
| 2,698,463 | 1/1955 | Conwell et al. | 18—57 |
| 2,763,029 | 9/1956 | Tulloss | 18—57 |
| 2,953,428 | 9/1960 | Hunt et al. | 18—48 |
| 3,008,185 | 11/1961 | Goldman | 18—57 |

FOREIGN PATENTS

| 555,363 | 4/1958 | Canada. |
| 173,082 | 5/1905 | Germany. |
| 694,870 | 7/1953 | Great Britain. |
| 787,479 | 12/1957 | Great Britain. |

ROBERT F. WHITE, *Primary Examiner.*

ALEXANDER H. BRODMERKEL, MICHAEL V. BRINDISI, *Examiners.*